(12) United States Patent
Chen et al.

(10) Patent No.: US 10,275,381 B2
(45) Date of Patent: Apr. 30, 2019

(54) MONITOR

(71) Applicant: Hewlett-Packard Development Company, L.P., Houston, TX (US)

(72) Inventors: Wen-Shih Chen, Taipei (TW); James Walter Stevens, Houston, TX (US); Alois Bonnet, Houston, TX (US); Humberto M. Fossati, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 94 days.

(21) Appl. No.: 15/409,177

(22) Filed: Jan. 18, 2017

(65) Prior Publication Data

US 2018/0204506 A1 Jul. 19, 2018

(51) Int. Cl.
| | |
|---|---|
| *G09G 1/00* | (2006.01) |
| *G09G 3/34* | (2006.01) |
| *G09G 5/22* | (2006.01) |
| *G09G 5/373* | (2006.01) |
| *G09G 5/391* | (2006.01) |

(Continued)

(52) U.S. Cl.
CPC ........ *G06F 13/385* (2013.01); *G06F 13/4282* (2013.01); *G09G 5/373* (2013.01); *G09G 1/005* (2013.01); *G09G 3/34* (2013.01); *G09G 5/227* (2013.01); *G09G 5/391* (2013.01); *G09G 2320/0626* (2013.01); *G09G 2320/08* (2013.01); *G09G 2330/021* (2013.01); *G09G 2340/04* (2013.01); *G09G 2360/08* (2013.01); *G09G 2370/00* (2013.01); *Y02D 10/14* (2018.01); *Y02D 10/151* (2018.01)

(58) Field of Classification Search
CPC .......... G09G 3/32; G09G 5/373; G09G 5/391; G09G 5/227; G09G 1/005; G09G 2340/04; G09G 2340/0407; G09G 2330/021; G09G 2330/023; G09G 2360/08; G09G 2310/08; G09G 2320/0626; G09G 2320/08; G09G 2370/00; G06F 13/4282; G06F 13/385; Y02D 10/14; Y02D 10/151
See application file for complete search history.

(56) References Cited

U.S. PATENT DOCUMENTS

| | | |
|---|---|---|
| 8,411,118 B2 | 4/2013 | Sheu et al. |
| 9,430,983 B2 | 8/2016 | Qu et al. |

(Continued)

OTHER PUBLICATIONS

ASUS MB169C+ Portable Monitor—15.6" FHD (1920×1080), USB Type-C, IPS, Flicker free, Low Blue Light, 2015, 10 pages, < https://www.asus.com/us/Monitors/MB169C-plus.

(Continued)

*Primary Examiner* — Srilakshmi K Kumar
*Assistant Examiner* — Brent D Castiaux
(74) *Attorney, Agent, or Firm* — Wall & Tong LLP (57) ABSTRACT

In example implementations, a monitor is provided. The monitor includes a timing controller coupled to a circuit board. A light emitting diode (LED) driver is coupled to the circuit board to power a plurality of LED backlights of the monitor. A scalar processor is coupled to the circuit board and in communication with the timing controller. A controller is coupled to the circuit board and in communication with the scalar processor. The controller receives power and video data via a single cable coupled to a host device.

16 Claims, 6 Drawing Sheets

(51) Int. Cl.
*G06F 13/38* (2006.01)
*G06F 13/42* (2006.01)

(56) References Cited

U.S. PATENT DOCUMENTS

| | | | |
|---|---|---|---|
| 2007/0120788 A1* | 5/2007 | Tsai | G09G 3/3611 345/87 |
| 2009/0153597 A1* | 6/2009 | Sheu | G09G 3/20 345/698 |
| 2010/0085375 A1* | 4/2010 | Chung | G09G 3/3406 345/589 |
| 2012/0056870 A1 | 3/2012 | Koh | |
| 2013/0176322 A1* | 7/2013 | Bakalash | G06T 15/005 345/522 |
| 2014/0035955 A1 | 2/2014 | Wang | |
| 2014/0104298 A1* | 4/2014 | Park | G09G 5/10 345/589 |
| 2016/0216757 A1 | 7/2016 | Kim et al. | |
| 2017/0308498 A1* | 10/2017 | Chen | G06F 13/385 |

OTHER PUBLICATIONS

Host-Side USB Type-C Port Configuration Switch for USB / DisplayPort Alt Mode, with Integrated Redriver and Port Controller with TCPC Interface, Dec 1, 2015, 4 pages, http://www.paradetech.com/products/usb-type-c-connectivity/ps8751.

Direct Drive LCD Timing Controller with 4-Lane DisplayPort Receiver, Sep. 22, 2009, 3 pages, http://www.paradetech.com/products/displayport-lcd-timing-controller-products/dp628-4-lane.

* cited by examiner

MONITOR

BACKGROUND

Monitors are used with computing devices to display video, graphics and documents. For example, the monitors can be connected to the computing device to display video data that is transmitted from the computing device to the monitor via a data connection.

DETAILED DESCRIPTION

Depending on the size of the monitor, the monitor uses several watts of power. Monitors include a separate external power adapter unit that receives power from a wall outlet that can supply the amount of power to operate the monitor. Thus, the monitor includes several connections, including, for example, a connection to the computing device, a power outlet connection, and the like.

In addition, monitors include several hardware components that contribute to a thickness or z-height of the monitor. For example, the monitor can include several different printed circuit boards for different chip sets, processors, controllers, and the like.

The present disclosure discloses a monitor that can be slimmer and consume less power by reducing hardware contained in the monitor. In addition, the present disclosure discloses methods for monitoring the incoming power and adjust operation of the monitor based on the amount of incoming power. As discussed above, many monitors use a separate external power adapter unit that receives power from a wall outlet. The additional hardware components used to provide separate external power can be a limiting factor in reducing the dimensions of the monitor. In addition, the separate external power supply uses an extra connection and cable that can add to the clutter of wires behind a host device and the monitor.

The examples of the present disclosure provide an ultra slim monitor that uses a single cable connected to a host device to receive video data and power. Hardware components within the monitor of the present disclosure are reduced leading to a slimmer design, lower costs to build and a reduction in the total power consumption of the monitor. As a result, the monitor may operate at a full resolution and full luminance from the power received from the host device. Alternatively, the monitor may operate at a lower resolution and luminance if the host device is unable to provide a sufficient amount of power.

Figure 1:
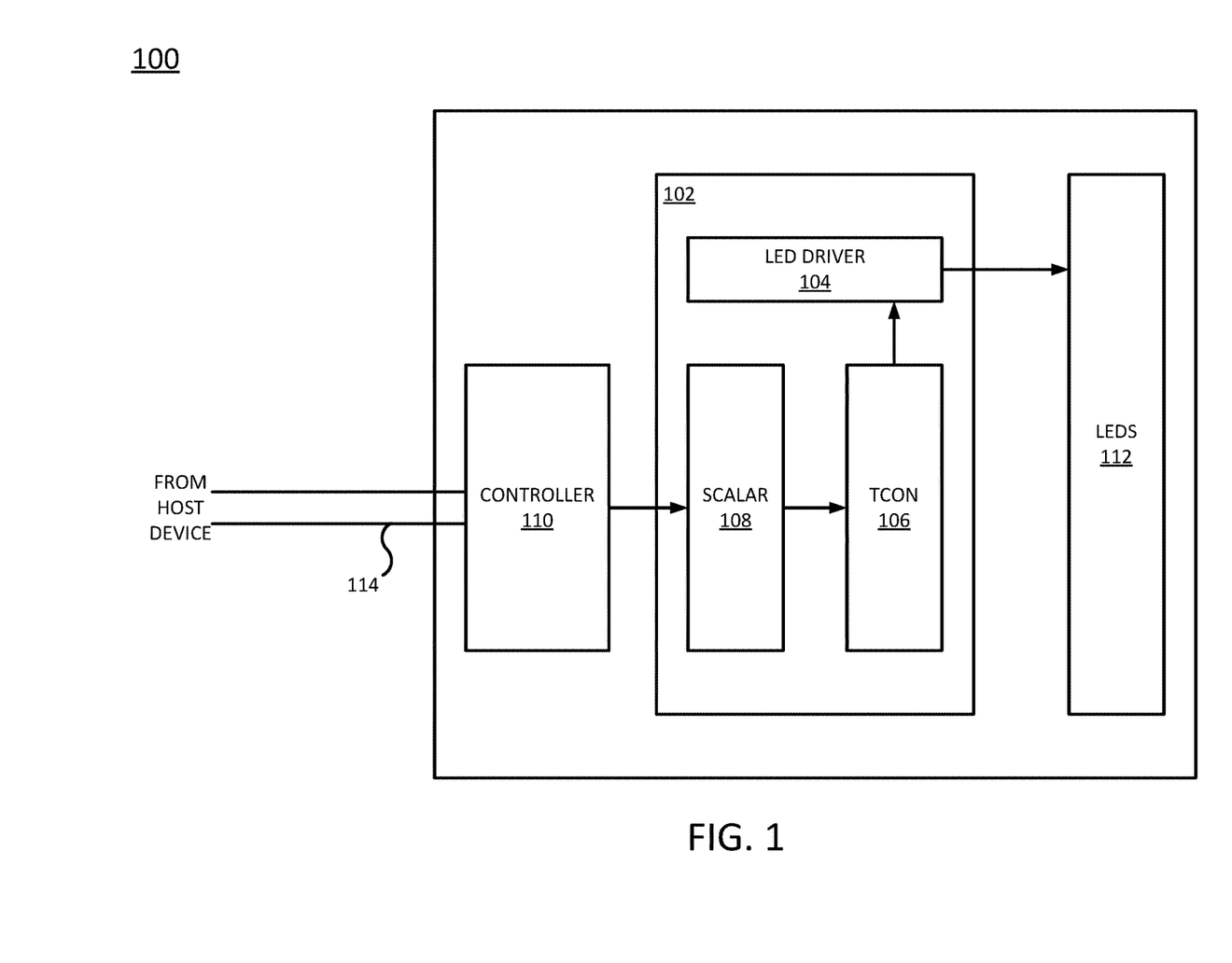
FIG. 1 is a block diagram of an example monitor of the present disclosure.

FIG. 1 illustrates a block diagram of an example monitor 100 of the present disclosure. The monitor 100 may be a display device that is used to produce video images from video image data sent from a host device. In one implementation, the monitor 100 may combine various hardware components onto a single circuit board 102. In one example, a light emitting diode (LED) driver 104, a timing controller (TCON) 106 and a scalar processor 108 may be combined onto the single circuit board 102. In some examples, the LED driver 104, the TCON 106, and the scalar processor 108 may be combined into a single chip (e.g., may be contained in a single package).

In one example, the LED driver 104 may power the LEDs 112 that provide backlight for the monitor 100. The scalar processor 108 may perform video input selection, image processing, on screen display insertion, overdrive processing, perform memory controls, and the like. The TCON 106 may receive an output from the scalar processor 108 and performs functions to drive individual pixel components of the monitor 100.

In contrast to having the LED driver 104, TCON 106 and the scalar processor 108 on separate respective circuit boards, using a single circuit board 102 or chip provides many advantages. For example, fewer hardware components within the monitor 100 allow the dimensions of the monitor 100 to be thinner. For example, the z-height may be reduced by using fewer circuit boards. In addition, eliminating hardware components within the monitor 100 reduces the cost to build.

Finally, combining the LED driver 104, TCON 106 and the scalar processor 108 onto the single circuit board 102 or onto a single chip may reduce the total power consumption of the monitor 100. As a result, a separate external power supply or an internal power supply unit may be eliminated. The power supply may add additional weight and bulk to the monitor 100. Reducing the total power consumption of the monitor 100 may allow the monitor 100 to be powered by a host device over a single cable 114 that provides power and video data to the monitor 100.

In one implementation, the single cable 114 may be a universal serial bus type-C cable (USB-C). The single cable 114 may provide display port video data and power from a host device to a controller 110. The controller 110 may be a USB-C controller that receives the video data and the power from the host device. The controller 110 may be in communication with the scalar processor 108. In one example, the scalar processor 108 may include a display port interface that is communicatively coupled to the controller 110 to receive the video data.

In one example, the single cable 114 may be able to provide sufficient amount of power to operate the monitor 100 at a maximum resolution. As the capability and standards of cabling change, the amount of power may also change. In one example, where the single cable 114 is a USB-C cable, a sufficient amount of power to operate the monitor 100 at a maximum resolution maybe 15 watts (W).

Notably, the monitor 100 does not contain any separate power supply unit and can operate via a single cable coupled to a host device. For example, the monitor 100 may not include a power supply other than the controller 110. As a result, the monitor 100 of the present disclosure provides a slimmer design that also provides a cleaner set up using the single cable 114 to receive power and video data. In other words, no separate power cable is used to provide power to the monitor 100.

It should be noted that the monitor 100 in FIG. 1 has been simplified for ease of explanation. The monitor 100 may include additional components that are not shown (excluding the specific hardware components described above such as a separate scalar board, separate TCON board, an internal power supply unit or an external power cable).

Figure 2:
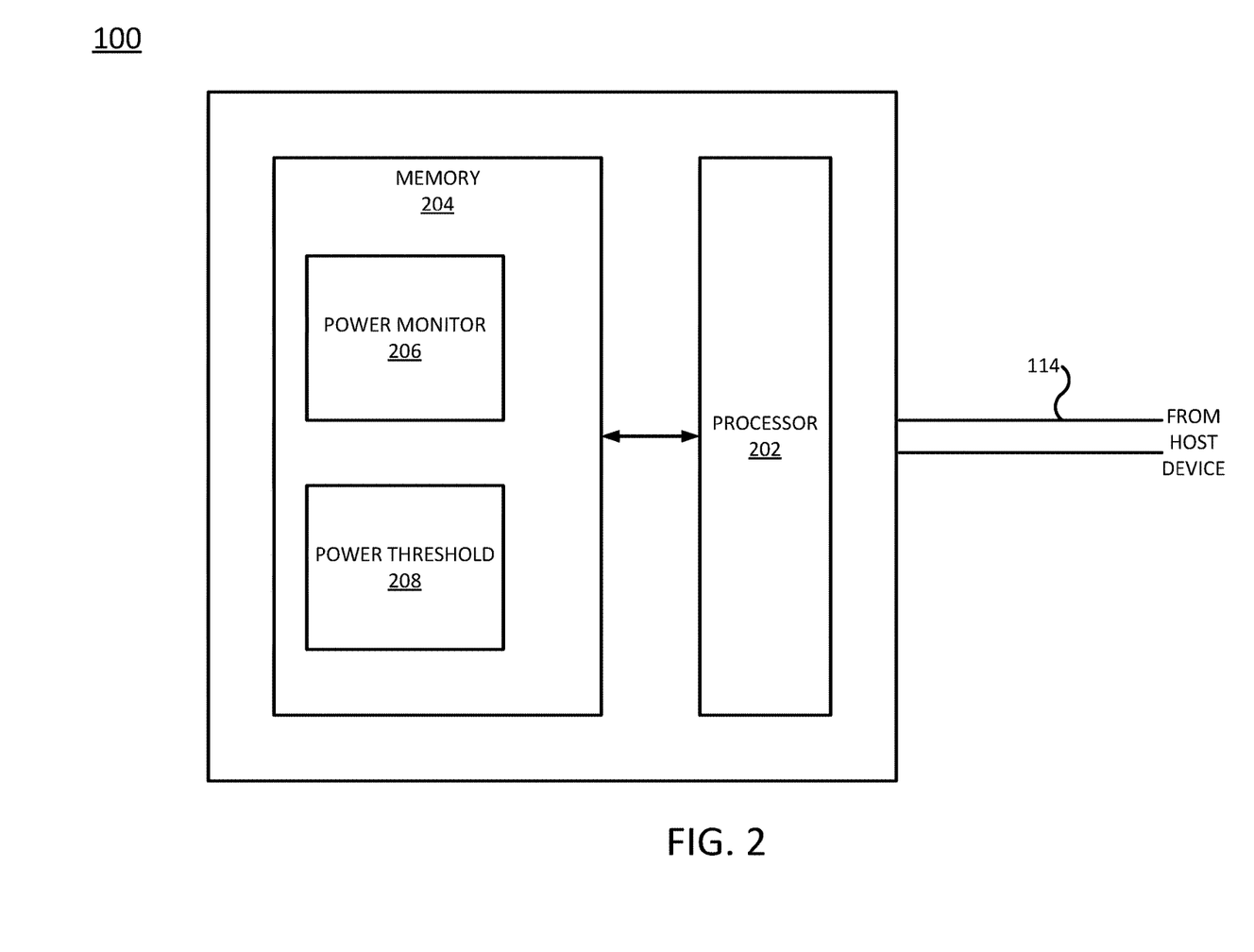
FIG. 2 is an example functional block diagram of the example monitor of the present disclosure.

FIG. 2 illustrates an example functional block diagram of the monitor 100. In one implementation, the monitor 100 may include a processor 202 and a memory 204. The memory 204 may be a non-transitory computer readable storage medium that stores instructions that are executed by the processor 202. In one example, the memory 204 may include a power monitor 206 and a power threshold 208.

As discussed above, the monitor 100 may combine several hardware components to reduce the power consumption of the monitor 100. For example, the monitor 100 may operate at a lower resolution and a lower luminance when an insufficient amount of power is provided by the host device.

In one example, the processor 202 may receive power and video data via the single cable 114. The processor 202 may execute the power monitor 206 that monitors the amount of incoming power. The power monitor 206 may compare the amount of incoming power to a power threshold 208 stored in the memory 204. For example, the power threshold 208 may be one or more pre-defined amounts of power that determine how the monitor 100 will operate. For example, a first pre-defined amount of power may be an amount of power sufficient to operate the monitor 100 at a lower resolution, but not sufficient enough to operate the monitor 100 at a maximum resolution. In one example, the amount of power sufficient to operate the monitor 100 at a lower resolution may be 7.5 W. A second pre-defined amount of power may be an amount of power sufficient to operate the monitor 100 at a maximum resolution. In one example, the amount of power sufficient to operate the monitor 100 at a maximum resolution may be 15 W.

In one implementation, if the amount of incoming power is greater than 15 W, the processor 202 may operate the monitor 100 at full resolution and at full luminance. For example, the monitor 100 may have a full resolution of 1920×1080 pixels (e.g., full high definition) and a full luminance at approximately 250 nits (nt). Thus, when the incoming power is greater than 15 W, the processor 202 may display video images at a resolution of 1920×1080 pixels and operate the LEDs 112 to provide at least 250 nt of luminance.

However, if the amount of incoming power is less than 15 W, but greater than 7.5 W, the processor 202 may operate the monitor at lower than full resolution and a lower than full luminance. For example, the processor 202 may operate the monitor 100 at a resolution of 1280×720 pixels and a luminance of approximately 100 nt.

In one implementation, if the amount of incoming power is less than 15 W, then a notification may be displayed. In one example, the notification may be part of the on screen display (OSD) of the monitor 100. The notification may warn the user that an insufficient amount of power is detected to operate the monitor 100 at a full resolution and a full luminance. The notification may suggest to the user to connect the single cable 114 to a different host device. The notification may also include an option to operate at the lower resolution and the lower luminance. If the processor 202 receives an input, or confirmation, (e.g., using a navigation interface of the monitor 100 that selects to continue operation of the monitor 100 at the lower incoming amount of power, the processor 202 may operate the monitor 100 as described above at 7.5 W or greater.

In one example, if the amount of incoming power is less than 7.5 W, the monitor 100 may display a notification that an insufficient amount of power is being received to operate the monitor 100. In one implementation, the monitor 100 may include a direct current (DC) power input as a fail-safe in case no host device can be found to provide sufficient power to operate even in the sub-optimal mode at a lower resolution and a lower luminance. The monitor 100 may then be able to charge a portable device and send power in an opposite direction towards the portable device that is connected to the monitor 100 via the single cable 114.

In one implementation, the power monitor 206 may continuously monitor the amount of incoming power. For example, the processor 202 may automatically adjust the resolution and the luminance based on the amount of incoming power. For example, if the amount of incoming power falls below 15 W and above 7.5 W, the processor 202 may automatically adjust operation of the monitor 100 to a lower resolution and a lower luminance from a full resolution and a full luminance.

In another example, the processor 202 may continually adjust the resolution or luminance based on the amount of incoming power. For example, the amount of incoming power may fluctuate to be slightly higher or slightly lower than 15 W. The processor 202 may throttle the luminance to an optimal luminance level as the incoming power rises above 15 W to provide the best front of screen (FOS) performance to the user. For example, when the incoming power rises above a power threshold of 15.5 W, the processor 202 may throttle the luminance of the monitor 100 to an optimum luminance level of 250 nt rather than allowing the increasing amount of power to raise the luminance to a higher level that may be too bright.

Figure 3:
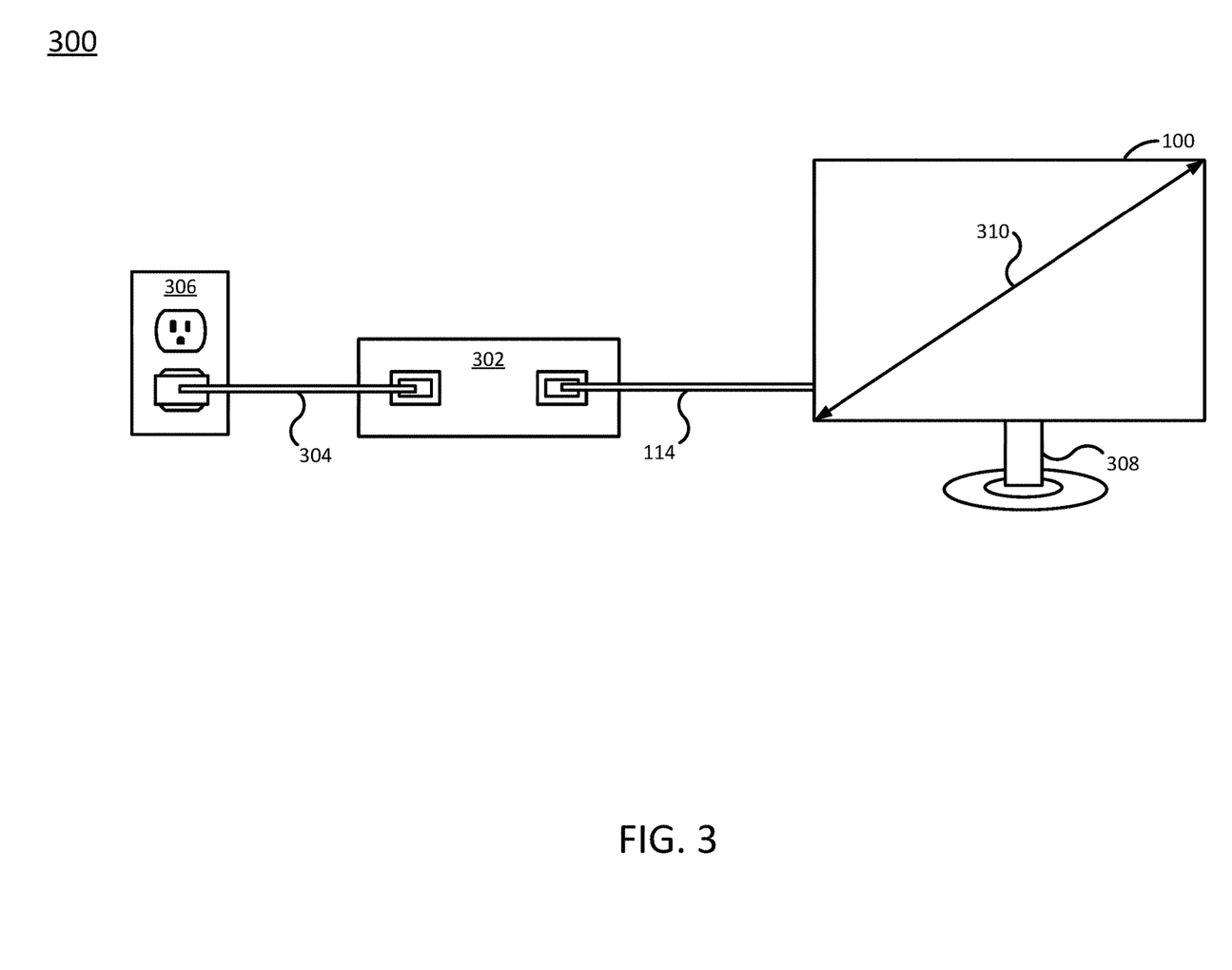
FIG. 3 is a block diagram of an example system including a host device and the example monitor of the present disclosure.

FIG. 3 illustrates a block diagram of an example system 300 that includes the monitor 100 and a host device 302. In one example, the host device 302 may be a desktop computer or a laptop computer. The host device 302 may have an external power connection 304 to a fixed power socket 306. For example, the fixed power socket 306 may provide alternating current (AC) power that is converted by the host device 302 into direct current (DC) power.

As discussed above, the monitor 100 may be connected to the host device 302 via the single cable 114 (e.g., a USB-C cable) that provides both video data and power. In one example, DC power from the host device 302 may be provided to the monitor 100 via the single cable 114. As a result, the monitor 100 does not use a power supply that is used to convert AC power into DC power. Rather, the monitor 100 may directly use the DC power received from the host device 302.

In one implementation, the single cable 114 may also be customized for the system 300. For example, the single cable 114 may be a customized USB-C pigtail cable when the monitor 100 is a monitor that has a maximum full high definition resolution of 1920×1080 pixels. The customized USB-C pigtail cable may remove two of the four twisted pairs found in a regular USB-C cable. In addition, the two wires for the USB 2.0 interface may also be removed. As a result, the customized USB-C pigtail cable may also be smaller and cheaper than a non-modified USB-C cable.

In addition, due to the smaller dimensions and lighter weight of the monitor 100, a lightweight stand 308 may be used. The lightweight stand 308 may also be thinner and made from lighter plastics to hold the monitor 100. The smaller lightweight stand 308 may help contribute to the overall clean and clutter free appearance of the system 300.

In one implementation, a display size 310 of the monitor 100 may be less than 24 inches. However, as the amount of power that can be delivered by the single cable 114 increases, the display size 310 may increase.

Figure 4:
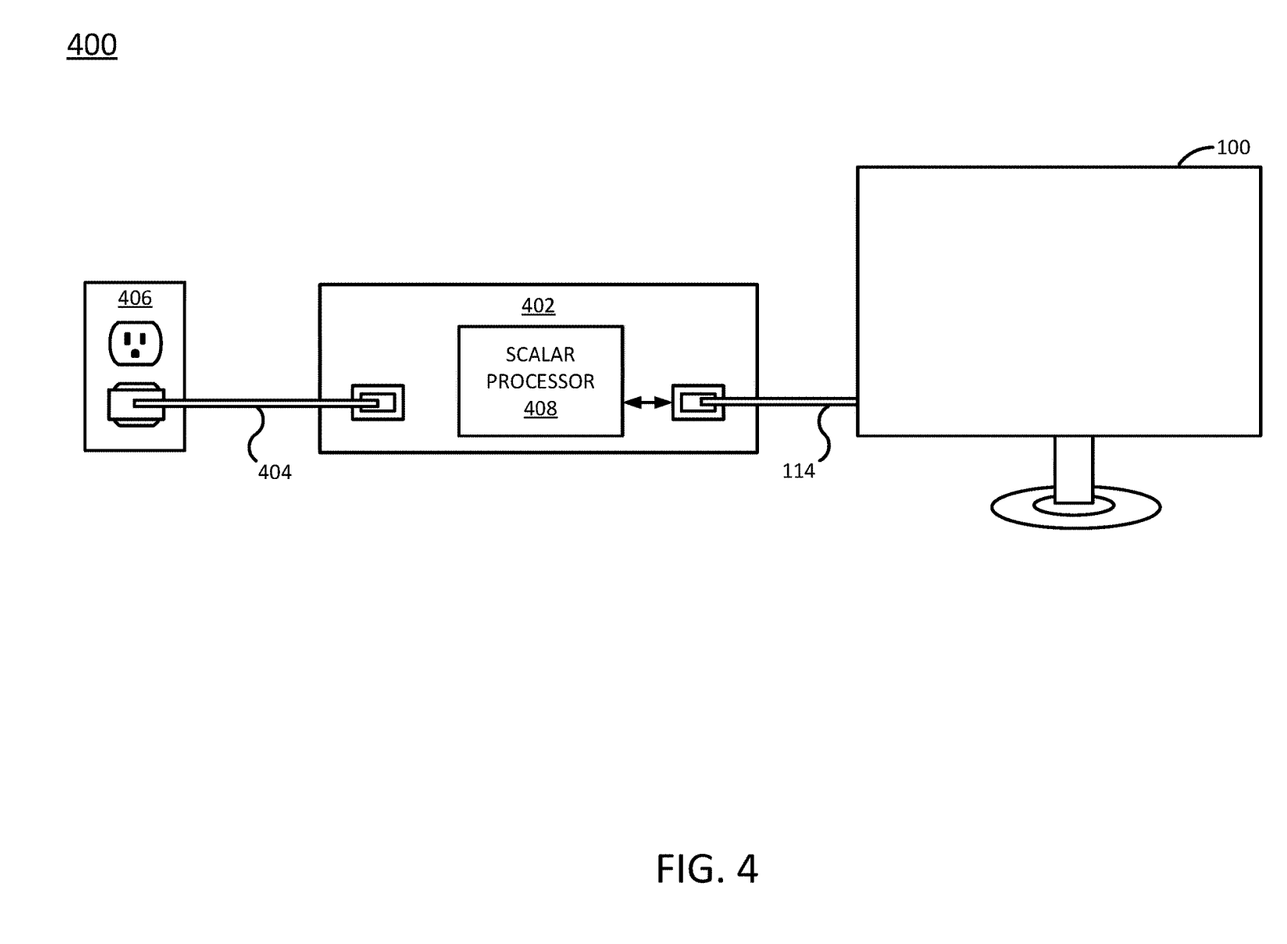
FIG. 4 is a block diagram of another example system including a host device and the example monitor.

FIG. 4 illustrates another example system 400 that includes a host device 402 and the monitor 100. The host device 402 may be a desktop computer or a laptop computer. The host device 402 may have an external power connection 404 to a fixed power socket 406. For example, the fixed power socket 406 may provide AC power that is converted by the host device 402 into DC power.

In one implementation, the monitor 100 may be connected to the host device 402 via the single cable 114 (e.g., a USB-C cable) that provides both video data and power. In one example, DC power from the host device 402 may be provided to the monitor 100 via the single cable 114. As a result, the monitor 100 does not use a power supply that is used to convert AC power into DC power. Rather, the monitor 100 may directly use the DC power received from the host device 402.

In addition, the host device 402 may include a scalar processor 408. In other words, the monitor 100 may not include a scalar processor. Rather, the scalar processor 408 may be moved to the host device 402. As a result, the monitor 100 may consume even less power. For example, the host device 402 may consume power from the fixed power socket 406 to operate the scalar processor 408. The scalar processor 408 may process the video data before it is sent to the monitor 100. The processed video data may be transmitted over the single cable 114 and the monitor 100 may simply produce the image based on the processed video data using the TCON 106, the LED driver 104 and the LEDs 112 shown in FIG. 1.

Figure 5:
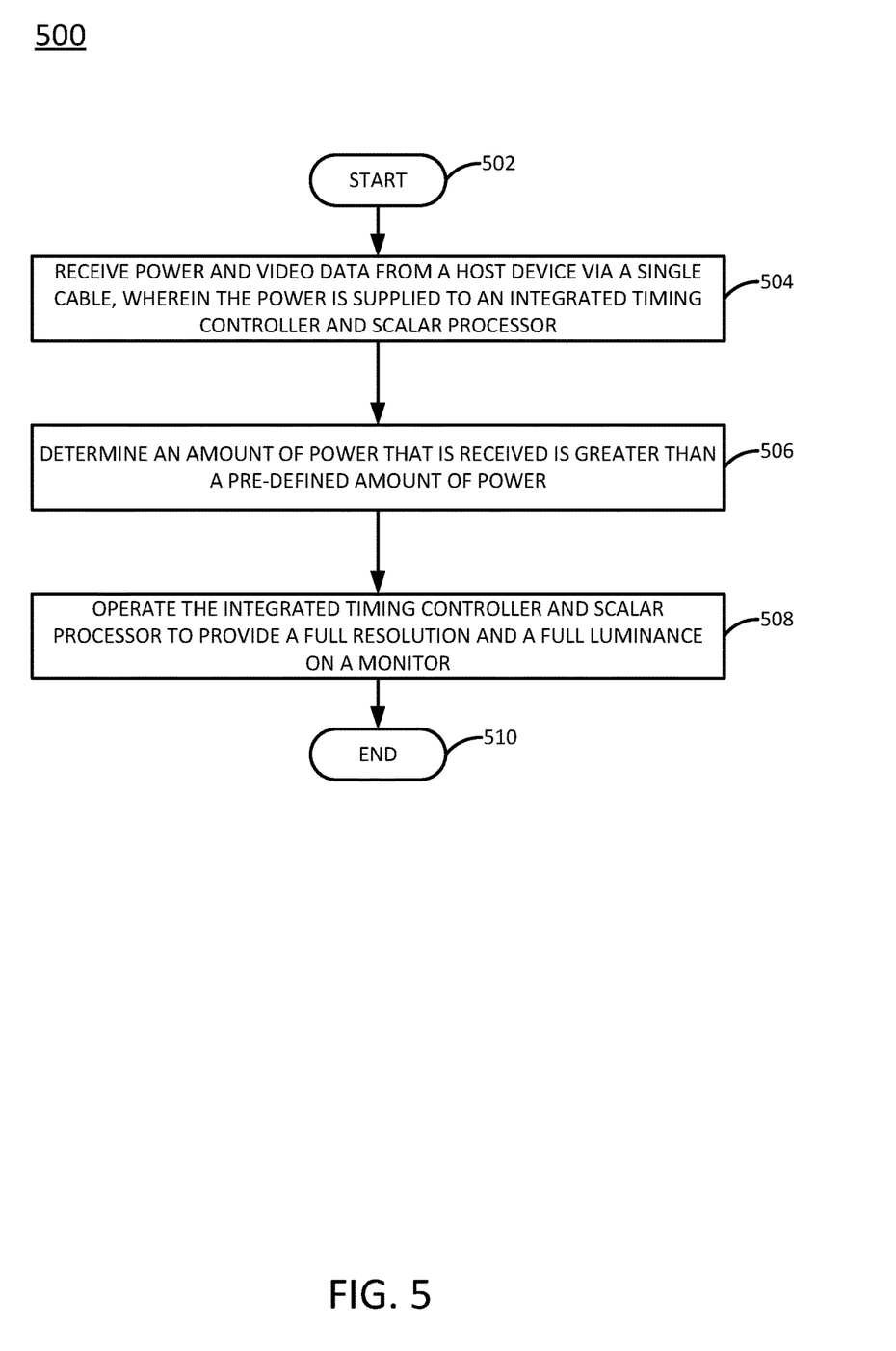
FIG. 5 is a block diagram of an example method for powering a monitor.

FIG. 5 illustrates a flow diagram of an example method 500 for monitoring power received by the monitor 100. In one example, the method 500 may be performed by the monitor 100 illustrated in FIGS. 1-3. For example, the scalar processor 108 or the processor 202 may perform the blocks of the method 500.

At block 502, the method 500 begins. At block 504, the method 500 receives power and video data from a host device via a single cable, wherein the power is supplied to an integrated timing controller and scalar processor. For example, the host device may be a desktop or laptop computer that is powered by an external power supply (e.g., an AC wall outlet). The single cable may be a USB-C cable. In one implementation, the single cable may be a customized USB-C cable that uses two twisted pairs and does not contain any USB 2.0 wires. In other words, two of the four twisted pairs in a USB-C cable can be removed such that two twisted pairs remain. As a result, the customized USB-C cable may be thinner and cheaper to produce, while still being able to provide full high definition (e.g., 1920×1080 pixels) resolution video data and power to the monitor 100.

In one example, the power and video data may be received by a monitor that has an integrated timing controller and scalar processor. For example, rather than having separate printed circuit boards for the separate components, the timing controller and the scalar processor may be combined into a single printed circuit board or a single chip.

At block 506, the method 500 determines an amount of power that is received is greater than a pre-defined amount of power. For example, the amount of power that is received may be compared to the pre-defined amount of power or a power threshold for optimal operation (e.g., 15 W).

At block 508, the method 500 operates the integrated timing controller and scalar processor to provide a full resolution and a full luminance on a monitor. For example, the full resolution may be a full high definition resolution of 1920×1080 pixels. The full luminance may be approximately 250 nt. However, it should be noted for higher power amounts that the full resolution may be higher (e.g., 4K high definition, ultra-high definition, and the like) and the full luminance may be brighter.

In some implementations, more than one power threshold may be stored that result in different actions. For example, a second power threshold may be a sub-optimal operation power threshold (e.g., 7.5 W). A third power threshold may be a throttling power threshold (e.g., 15.5 W). However, it should be noted that any number or value of pre-defined amounts of power may be used.

When the amount of power that is received at block 506 is not greater than the pre-defined amount of power, but higher than the second power threshold, then the monitor may operate in a sub-optimal mode. For example, the monitor may operate with between 7.5 W and 15 W of power at a lower resolution and a lower luminance. In one example, a notification message may be displayed when the amount of power is below the pre-defined amount of power for optimal operation. The notification message may allow the user to provide confirmation to continue operation with the lower amount of power or instruct the user to connect the single cable to another host device. If the user provides a confirmation to continue operation at the lower amount of power, the monitor may continue operating at a lower than full resolution and a lower than full luminance.

In one implementation, the method 500 may continuously monitor the amount of power that is received while the monitor is operating. The luminance may be adjusted as the amount of power that is received fluctuates. For example, the luminance may be throttled to an optimal luminance level despite the amount of power increasing (e.g., higher amounts of power may be correlated with higher levels of luminance). At block 510, the method 500 ends.

Figure 6:
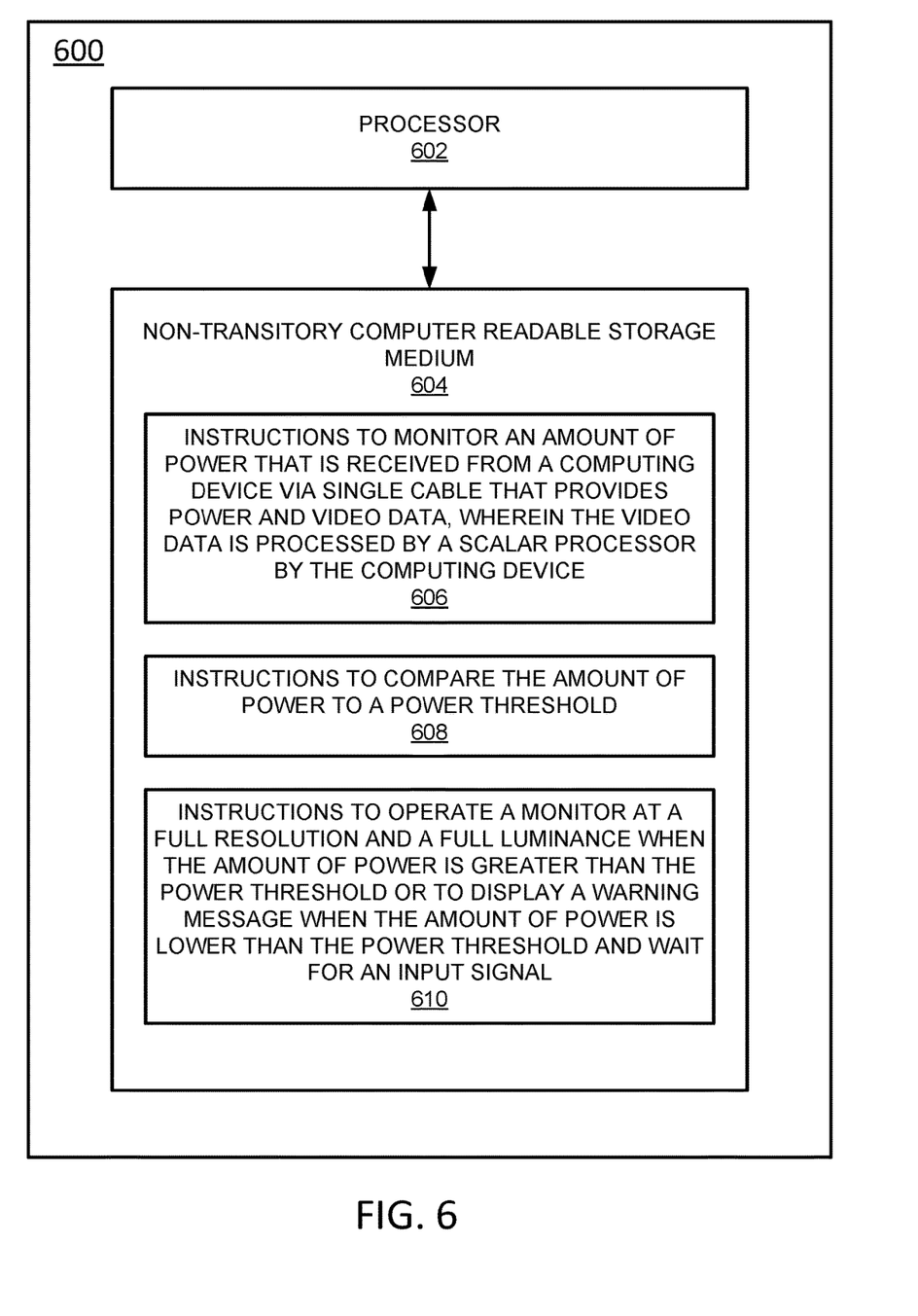
FIG. 6 is a block diagram of an example non-transitory computer readable medium storing instructions executed by a processor.

FIG. 6 illustrates an example of an apparatus 600. In one example, the apparatus may be the monitor 100. In one example, the apparatus 600 may include a processor 602 and a non-transitory computer readable storage medium 604. The non-transitory computer readable storage medium 604 may include instructions 606, 608 and 610 that when executed by the processor 602, cause the processor 602 to perform various functions.

In one example, the instructions 606 may include instructions to monitor an amount of power that is received from a computing device via a single cable that provides power and video data, wherein the video data is processed by a scalar processor in the computing device. The instructions 608 may include instructions to compare the amount of power to a power threshold. The instructions 610 may include instructions to operate a monitor at a full resolution and a full luminance when the amount of power is greater than the power threshold or to display a warning message when the amount of power is lower than the power threshold and wait for an input signal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A monitor comprising:
   a timing controller coupled to a circuit board;
   a light emitting diode (LED) driver coupled to the circuit board to power a plurality of LED backlights of the monitor;

a scalar processor coupled to the circuit board and in communication with the timing controller, wherein the circuit board for the timing controller and the scalar processor is a single circuit board;

a power monitor to monitor an incoming amount of power from a single cable coupled to a host device; and a controller coupled to the circuit board and in communication with the scalar processor, wherein the controller receives the power and video data via the single cable coupled to the host device and the controller is to adjust a resolution and a luminance of the monitor based on the amount of power that is received, wherein the controller is to throttle the luminance to prevent the luminance from rising as the amount of power rises when the amount of power exceeds a power threshold.

2. The monitor of claim 1, wherein the scaler processor comprises a display port communicatively coupled to the controller.

3. The monitor of claim 1, wherein the monitor operates at a resolution of 1920×1080 pixels or less.

4. The monitor of claim 1, wherein the single cable is a universal serial bus type-C (USB-C) cable.

5. The monitor of claim 4, wherein the USB-C cable is customized to remove two twisted pairs and the monitor operates on two twisted pairs of the USB-C cable.

6. The monitor of claim 1, wherein the power received from the single cable is sufficient to operate at a maximum resolution.

7. The monitor of claim 1, wherein the power received from the single cable is sufficient to operate in a sub-optimal mode at a lower resolution and a lower luminance.

8. A method comprising:

receiving power and video data from a host device via a single cable, wherein the power is supplied to an integrated timing controller and scalar processor coupled to a single circuit board;

determining an amount of power that is received is greater than a pre-defined amount of power;

operating the integrated timing controller and scalar processor to provide a full resolution and a full luminance on a monitor;

continuously monitoring the amount of power that is received while the monitor is operating; and adjusting a resolution and a luminance of the monitor as the amount of power that is received fluctuates, wherein the adjusting comprises throttling the luminance to prevent the luminance from rising as the amount of power rises when the amount of power exceeds the pre-defined amount of power.

9. The method of claim 8, comprising:

determining that the amount of power that is received is lower than the pre-defined amount of power; and displaying a warning message via the monitor that the amount of power that is received is insufficient to operate the monitor at the full resolution and the full luminance.

10. The method of claim 9, comprising:

receiving a confirmation to continue operation of the monitor with the amount of power that is lower than the predefined amount of power; and operating the monitor at a lower resolution and a lower luminance level with the amount of power that is lower than the predefined amount of power.

11. The method of claim 8, wherein the pre-defined amount of power comprises an amount of power sufficient to operate the monitor at a lower resolution.

12. A non-transitory computer readable storage medium encoded with instructions executable by a processor of, the non-transitory computer-readable storage medium comprising:

instructions to monitor an amount of power that is received from a computing device via a single cable that provides power and video data, wherein the video data is processed by a scalar processor and a timing controller on a single circuit board in the computing device;

instructions to compare the amount of power to a power threshold;

instructions to operate a monitor at a full resolution and a full luminance when the amount of power is greater than the power threshold or to display a warning message when the amount of power is lower than the power threshold and wait for an input signal;

instructions to continuously monitor the amount of power when the monitor operates at the full resolution and the full luminance; and instructions to adjust the luminance of the monitor as the amount of power rises above the power threshold, wherein the instructions to adjust comprise throttling the luminance to prevent the luminance from rising as the amount of power rises when the amount of power exceeds the power threshold.

13. The non-transitory computer readable storage medium of claim 12, wherein the warning message provides an option to change to a different computing device or operate the monitor at a sub-optimal resolution and luminance.

14. The non-transitory computer readable storage medium of claim 13, wherein the input signal comprises a confirmation from a user to continue to operate the monitor at the sub-optimal resolution and luminance with the amount of power that is lower than the power threshold.

15. The non-transitory computer readable storage medium of claim 14, wherein the sub-optimal resolution and luminance comprise a lower resolution and a lower luminance level than a maximum resolution and a maximum luminance level.

16. The non-transitory computer readable storage medium of claim 14, wherein the amount of power that is lower than the power threshold comprises an amount of power sufficient to operate the monitor at a lower resolution.

* * * * *